July 7, 1970  E. L. KOLM  3,518,812
PROCESS FOR REMOVING DUST FROM HOT DUST-LADEN GASES
Filed July 10, 1968
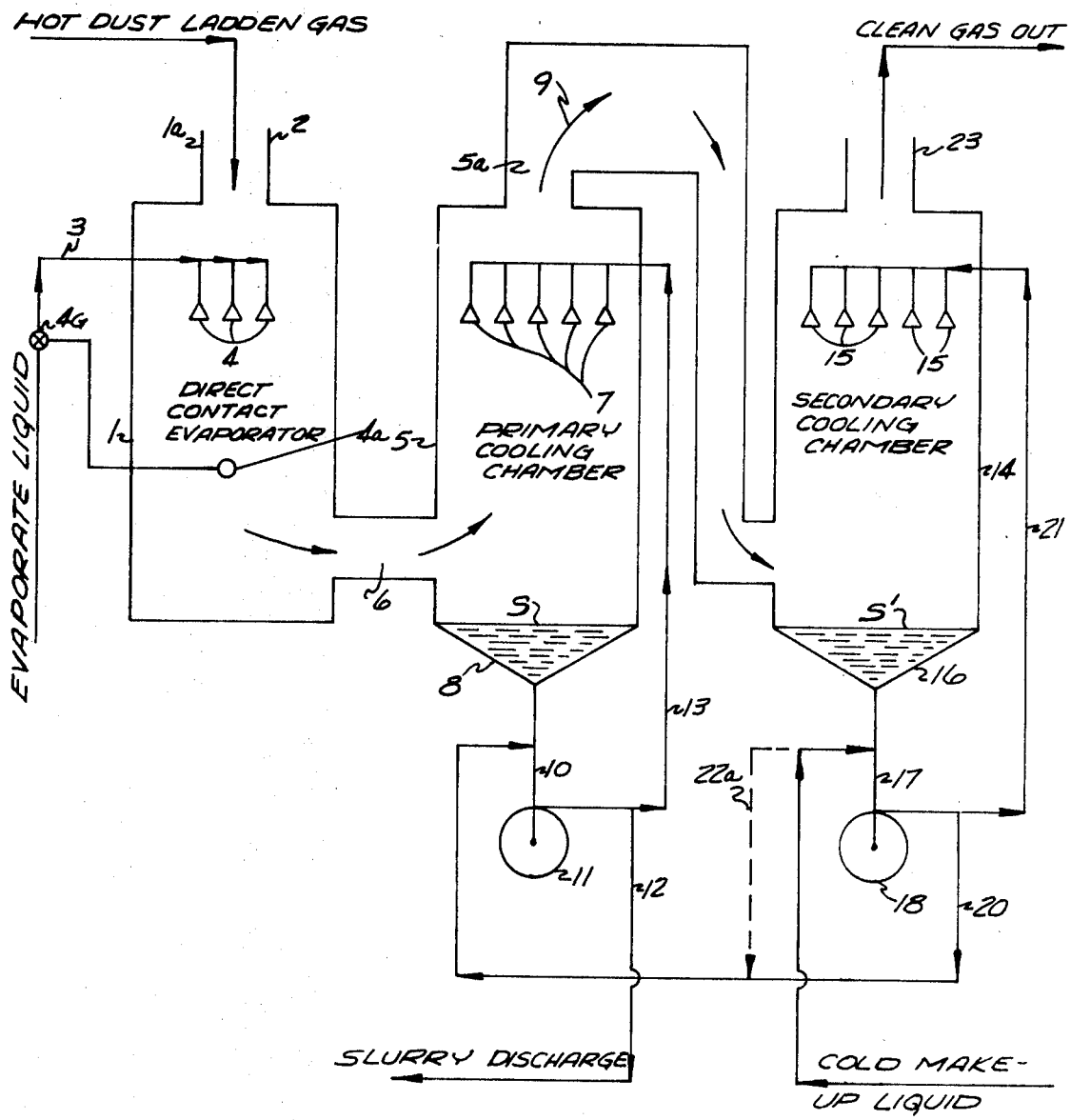
INVENTOR
*Ernest L. Kolm*
BY *Oldham & Oldham*
ATTORNEY United States Patent Office 3,518,812
Patented July 7, 1970

3,518,812
PROCESS FOR REMOVING DUST FROM HOT
DUST-LADEN GASES
Ernest L. Kohn, 419 W. Cambridge St.,
Alliance, Ohio 44601
Filed July 10, 1968, Ser. No. 743,837
Int. Cl. B01d 47/00
U.S. Cl. 55—20
8 Claims

ABSTRACT OF THE DISCLOSURE

The process for removing suspended solid particles in a hot gas which consists of humidifying the gas to just as near 100% saturation as possible without exceeding 100% saturation while maintaining the temperature of the gas when saturated above the dew point, condensing the liquid in the humidified gas by reducing the temperature thereof to substantially below the dew point, and collecting the liquid and discharging it to a slurry.

---

In recent years air pollution in industrial areas has become an increasingly difficult problem. This is caused by dust laden gases from basic oxygen steel processing furnaces, lime kilns, blast furnaces, and the like. Efforts have been made to clean such polluted air, but such apparatus as has been produced for effectively accomplishing this purpose is extremely expensive.

The object of the present invention is to provide a process for removing dust from hot dust-laden gases by means of a simple, inexpensive apparatus that will operate at a significantly lower cost than present units.

Another object of the invention is to provide a process whereby thermal energy in the processed gas will be utilized to evaporate a liquid media whereby the gas is saturated but kept above a dew point until the gas can be cooled below saturation by the same or another liquid media in a cooling device.

Another object of the invention is to provide such a process in which the gases may be passed from the primary cooling chamber into a secondary cooling chamber in which a cold liquid is sprayed into the gas stream to further decrease the gas temperature and further condense any remaining vapor.

The above objects, together with others which will be apparent from the drawing and following description, or which may be later referred to, may be attained by carrying out the process for removing dust from hot dust-laden gases in the manner hereinafter described in detail and illustrated in the accompanying drawing.

The improved process may be briefly described in general terms as a method particularly designed for the removal of dust such as that which is discharged by chimneys of basic oxygen furnaces, electric steel processing furnaces, oxygen lanced open hearth steelmaking processes, or the like. The process may consist of a direct contact evaporator, a primary cooling chamber, and a secondary cooling chamber. The equipment used for the evaporator may be any conventional spray tower, venturi, or orifice type wet scrubbing equipment. These same components may be used in the cooling chamber section or a surface type condenser may be used.

In the evaporator hot gases laden with dust from a basic oxygen furnace or the like may be conveyed into the top of the evaporator, which may be a typical spray tower or the like. The gases may enter the evaporator at a temperature range of about 400° F. to 3,500° F., and as the hot dust-laden gases are passed through the evaporator, liquid is sprayed into the gas stream. The spray device is controlled so that the temperature in the evaporator is maintained above the dew point of the gaseous mixture.

The liquid for the evaporator sprays is preferably preheated. This may be done in any conventional manner. Also, a portion of the slurry from the primary cooling chamber may be used as part of liquid spray in the evaporator. Depending on the evaporator utilized, the percentage of slurry will vary between about 5% to about 65% of the total liquid spray, with the remainder a fresh make-up.

As the liquid comes into contact with the hot dust-laden gases, it is immediately evaporated, forming a vaporous gas. The dust-laden gases, now saturated with the vapors at a temperature above the dew point are then passed from the evaporator into the cooling chamber, and as the vapor saturated dust-laden gases rise therein, a relatively larger amount of liquid is sprayed into the same, cooling them to a temperature below the dew point, thus condensing the vapor so that it may drop into a sump at the bottom of the cooling chamber, while the gas passes out of the top thereof. The evaporation upon condensing forms a droplet with the dust particles as the nucleus whereupon agglomeration of said droplets by the recirculated liquid, forms a slurry in the sump of the cooling chamber. A part of this slurry may be removed from the sump by a pump to be discharged to any desired place while a greater portion thereof is recirculated to the spray nozzles in the cooling chamber, or may be recirculated to all stages of the process.

In some cases a second cooling chamber may be necessary or desirable depending upon application. The second cooling chamber comprises a cooling tower or the like which receives the gases from the primary cooling chamber and passes them through a cooled liquid spray which further decreases the gas temperature and further condenses any vapor remaining therein to provide a higher collection efficiency of the dust as described for the primary cooling chamber.

The clean gas is withdrawn from the second cooling chamber at a temperature of approximately 100° F. to 150° F. and may be discharged into the atmosphere without polluting the same.

For a better understanding of the invention reference should be had to the drawing which schematically illustrates the preferred embodiment of the invention.

A direct contact evaporator is generally indicated by numeral 1. This evaporator 1 could be described as a typical spray tower. Hot dust-laden gases from a basic oxygen furnace or the like may enter the top opening 1a of an evaporator chamber 1b, as indicated at 2. These dust-laden gases may have temperatures from about 400° F. to 3,500° F.

A water pipe 3 enters the upper end of the evaporator chamber 1 and has thereon a spray device 4 which sprays a liquid into the descending stream of hot dust laden gases. The spray device 4 is controlled so that all of the liquid sprayed therefrom is evaporated and remains in a gaseous state, above the dew point of the gas. The control to this end is critical to the efficient operation of the system and is accomplished by positioning a humidity detector 4a within the chamber 1b which directly controls a flow valve 4b. The valve 4b controls the pressure and rate of flow of the liquid through pipe 3.

The dust-laden gas, now saturated with the liquid vapor, flows into the lower end 6 of a primary cooling chamber 5 indicated at 6. At the upper end of cooling chamber 5 is located a spray device 7 for spraying a considerable amount of liquid downward into the upwardly moving stream of vapor saturated dust-laden gas.

This lowers the temperature of the same to about 170° F. to 200° F. condensing the vapor so that it forms droplets whose nuclei are the dust particles themselves. This condensate and dust together with the recirculated liquid media form a slurry indicated at S, which drops into the sump 8, at the lower end of the chamber 5 while the gas passes up out the opening 5a at the top of the primary cooling chamber as indicated by the arrow 9.

The liquid supplied to the spray device 7 in the upper end of the primary cooling chamber 5 is preferably the slurry S which is discharged from the sump 8 through a pipe 10 to the pump 11 which pumps a portion of the slurry through the slurry-discharge pipe 12 to any convenient point of disposal while the remainder of the slurry is pumped through the pipe 13 through the spray device 7 and recirculated. The reason for using the slurry for spray cooling and condensing is that it may be handled more easily in a conventional filtering system. The concentration of the slurry would be controlled in the sumps to suit the filtering system.

The secondary cooling chamber 14 shown in the drawing is a "bonus" to the process above-described and may or may not be necessary, depending upon the particular application and the degree of contamination of the gas. This secondary cooling chamber, when used, is utilized to further decrease the gas temperature and provides means of supplying a cooling liquid into the gas stream to further condense any remaining water vapor that would in turn form a droplet around a dust particle as a nucleus of the liquid droplet and further increase the dust collecting efficiency.

The secondary cooling chamber equipment includes a spray tower or chamber indicated generally at 14. Spray devices 15 are provided in the upper portion of the secondary cooling chamber 14 for spraying a considerable amount of liquid downward into the upwardly moving stream of the vapor saturated partially cleaned gases.

The liquid supplied to the spray device 15 at the upper end of the secondary cooling chamber is preferably the slurry $S^1$ which is discharged from the sump 16 through a pipe 17 to the pump 18 which pumps a portion of the slurry to the slurry discharge pipe 20 to the primary cooling chamber at pipe 10 while the remainder of the slurry is piped through the pipe 21 to the spray device 15 and recirculated. A cold liquid make-up to the system is supplied by pipe 22.

The ascending gas stream in the secondary cooling chamber 14 is sprayed with cold water from the spray devices 15 and the clean gas is discharged from the upper end of the chamber 14 through the duct 23 into the atmosphere at a temperature of about 100° F. to 150° F.

In cases where high dust loadings are encountered from a process where temperatures are relatively low, the make-up liquid to the system would be adequate for the spray in the first stage. However, if low dust loadings are encountered along with high gas temperatures, the amount of make-up water to the system, as shown and described in the drawing, would be too great to allow a reasonable slurry concentration. To alleviate this situation, the water to the first stage could come from the sump, i.e., the slurry itself, and the make-up water in this case would be added to the dischrage pipe between the sump and pump, as indicated by dotted pipe 22a.

From the above, it will be obvious that an efficient process is provided for removing dust from hot dust-laden gas, the process being accomplished by the use of simple and inexpensive equipment, by means of a vapor which is manufactured by the thermal energy of the hot dust-laden gas and is condensed, forming droplets whose nuclei are the dust particles themselves, these droplets being agglomerated and collected in the form of a liquid slurry, a portion of which is recirculated into the primary cooling chamber or all stages of the process while the remainder thereof is discharged to any suitable location, clean gas being discharged from the equipment at a greatly reduced temperature.

In the foregoing description certain terms have been used for brevity, clearness, and understanding, but no unnecessary limitations are to be implied therefrom beyond the requirements of the prior art, because such words are used for descriptive purposes herein and are intended to be broadly construed.

Moreover, the embodiments of the improved construction and process illustrated and described herein are by way of example, and the scope of the present invention is not limited to the exact details shown.

Having now described the invention or discovery, the construction, the operation, and use of preferred embodiments thereof, and the advantageous new and useful results obtained thereby; and reasonable mechanical equivalents thereof obvious to those skilled in the art are set forth in the appended claims.

What is claimed is:

1. The process for removing suspended solid particles in a hot gas which consists of:
    (1) humidifying the gas to just as near 100% saturation as possible without exceeding 100% saturation by spraying water into the gas, controlling the amount of water sprayed and maintaining the temperature of the saturated gas above its dew point while evaporating 100% of the sprayed water by the heat of the gases,
    (2) condensing the vapor in the humidified gas by reducing the temperature thereof to substantially below the dew point, and
    (3) collecting the condensed vapor and discharging it to a slurry.

2. The process of claim 1 where the condensing is accomplished by spraying cool water in a high momentum reverse flow total coverage into the nearly 100% saturated gas so as to achieve a rapid temperature reduction of the gas.

3. The process of claim 2 where between about 5% to about 65% of the sprayed cool water is made up of the slurry discharge of the collected condensed liquid.

4. The process according to claim 2 which includes spray cooling in at least two stages with opposed flow between the cooling spray and the gas and where the succeeding stages utilize a slurry discharge concentration less than the concentration in each preceding stage.

5. The process according to claim 4 where the temperature of each succeeding stage is at a lower temperature than its immediately preceding stage.

6. The process of claim 1 where the hot gas is between 400° F. and 3,500° F. as it enters the process and is between 100° F. to 150° F. as it leaves the process, and where humidification is accomplished by spraying a controlled amount of water into the gas to achieve total evaporation thereof.

7. A process for removing dust from hot dust-laden gases which consists of admitting hot dust-laden gases in the upper end of a direct contact evaporator, bringing said hot dust-laden gases into contact with water sprayed into said evaporator, controlling the amount of water sprayed, evaporating 100% of the sprayed water by the heat of the gases so that the gases approach nearly 100% vapor saturation while maintaining the temperature of the vapor-gas-dust mixture above its dew point, discharging the same to a cooling device and therein condensing the vapor by spraying a large volume of liquid into the upper portion of said cooling chamber, whereby the vapor contained in the dust-laden gases upon condensing forms droplets whose nuclei are the dust particles themselves, discharging the liquid of condensation and dust in the form as a slurry from the bottom of said cooling chamber and discharging clean gas from the top thereof.

8. The process for removing dust from hot dust-laden gases as defined in claim 7, in which the gas is discharged from the primary cooling device into a secondary cooling device and cooled liquid is sprayed into said secondary cooling device to further decrease the gas temperature and further condense the water vapor which in turn will increase the dust collection efficiency in the same manner as described in claim 7, and where the spraying in each device is against the direction of gas flow.

References Cited

UNITED STATES PATENTS

| | | | |
|---|---|---|---|
| 3,073,092 | 1/1963 | Ancrum et al. | 55—94 |
| 3,183,645 | 5/1965 | Teller | 55—20 |
| 3,358,413 | 12/1967 | Kalika | 261—79.1 |
| 3,431,707 | 3/1969 | Berg | 55—20 |

REUBEN FRIEDMAN, Primary Examiner

C. N. HART, Assistant Examiner

U.S. Cl. X.R.

55—89, 94